US009019903B2

(12) United States Patent
Palanki et al.

(10) Patent No.: US 9,019,903 B2
(45) Date of Patent: Apr. 28, 2015

(54) OPTIMIZATION TO SUPPORT UPLINK COORDINATED MULTI-POINT

(75) Inventors: Ravi Palanki, San Diego, CA (US); Alexei Y. Gorokhov, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 12/632,094

(22) Filed: Dec. 7, 2009

(65) Prior Publication Data

US 2010/0142466 A1 Jun. 10, 2010

Related U.S. Application Data

(60) Provisional application No. 61/120,659, filed on Dec. 8, 2008.

(51) Int. Cl.
*H04W 4/00* (2009.01)
*H04W 72/04* (2009.01)
*H04J 11/00* (2006.01)
*H04L 5/00* (2006.01)
*H04L 25/02* (2006.01)
*H04W 72/08* (2009.01)

(52) U.S. Cl.
CPC ....... *H04W 72/0406* (2013.01); *H04J 11/0053* (2013.01); *H04L 5/0032* (2013.01); *H04L 5/0091* (2013.01); *H04L 5/0007* (2013.01); *H04L 25/0202* (2013.01); *H04W 72/082* (2013.01)

(58) Field of Classification Search
None
See application file for complete search history.

(56) References Cited

U.S. PATENT DOCUMENTS

| 6,496,490 | B1 * | 12/2002 | Andrews et al. | 370/329 |
| 2001/0021650 | A1 * | 9/2001 | Bilgic | 455/418 |
| 2006/0104334 | A1 * | 5/2006 | Hervey et al. | 375/133 |
| 2006/0209754 | A1 * | 9/2006 | Ji et al. | 370/329 |

(Continued)

FOREIGN PATENT DOCUMENTS

| CN | 101053272 A | 10/2007 |
| WO | WO 2007075133 | 7/2007 |

(Continued)

OTHER PUBLICATIONS

3GPP TSG RAN WG1 Meeting #54bis R1-083709,"CoMP clarification of definitions and TP", Huawei, CMCC, Oct. 3, 2008, 6 pages.

(Continued)

*Primary Examiner* — Khoa Huynh
(74) *Attorney, Agent, or Firm* — Dalei Dong

(57) ABSTRACT

Systems and methodologies are described that facilitate assigning uplink resources for utilization by a mobile device for sending an uplink signal in an uplink coordinated multi-point (CoMP) wireless communication environment. For instance, a hopping tree can be defined across base stations, and neighboring base stations can schedule interfering mobile devices upon uplink resources mapped to different nodes from the hopping tree. By way of another example, a plurality of hopping trees can be employed across base stations in the uplink CoMP wireless communication environment. Moreover, an acknowledgment can be sent to the mobile device upon downlink resources identified as a function of the uplink resources. Further, the downlink resources can be distinct from disparate downlink resources utilized for sending an acknowledgment to a disparate mobile device from a neighboring base station.

43 Claims, 10 Drawing Sheets

(56) References Cited

U.S. PATENT DOCUMENTS

| | | | |
|---|---|---|---|
| 2007/0211657 A1* | 9/2007 | McBeath et al. | 370/329 |
| 2008/0084843 A1* | 4/2008 | Gorokhov et al. | 370/330 |
| 2008/0311942 A1* | 12/2008 | Kim et al. | 455/509 |
| 2008/0318608 A1* | 12/2008 | Inoue et al. | 455/509 |
| 2009/0225720 A1* | 9/2009 | Molisch et al. | 370/330 |
| 2012/0093093 A1* | 4/2012 | Frenger et al. | 370/329 |

FOREIGN PATENT DOCUMENTS

| | | | |
|---|---|---|---|
| WO | WO 2007075133 A1 * | 7/2007 | |
| WO | WO-2007075133 A1 | 7/2007 | |
| WO | WO 2007117468 | 10/2007 | |
| WO | WO-2007117468 A2 | 10/2007 | |
| WO | WO 2007117468 A2 * | 10/2007 | |

OTHER PUBLICATIONS

Ericsson: "R1-082469: LTE-Advanced Coordinated Multipoint Transmission/Reception," (Jun. 30-Jul. 4, 2008) Internet Citation pp. 1-6, Retrieved on Jul. 4, 2008, XP002574186.
International Search Report—PCT/US09/067214, International Search Authority, European Patent Office—May 4, 2010.
Taiwan Search Report—TW098141917—TIPO—Dec. 4, 2012.
Written Opinion—PCT/US2009/067214, International Search Authority, European Patent Office, May 4, 2010.

\* cited by examiner

OPTIMIZATION TO SUPPORT UPLINK COORDINATED MULTI-POINT

CLAIM OF PRIORITY UNDER 35 U.S.C. §119

The present Application for patent claims priority to Provisional Application No. 61/120,659 entitled "OPTIMIZATIONS TO SUPPORT UPLINK NETWORK MIMO IN LTE" filed Dec. 8, 2008, and assigned to the assignee hereof and hereby expressly incorporated by reference herein.

BACKGROUND

1. Field

The following description relates generally to wireless communications, and more particularly to implementing optimizations that support uplink coordinated multi-point (CoMP) in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Traditionally, in a wireless communication network with multiple base stations and multiple mobile devices, each mobile device is typically associated with a particular one of the multiple base stations. For instance, a mobile device can be associated with a given base station as a function of various factors such as signal strength, Channel Quality Indicator (CQI), and so forth. Thus, the mobile device can be served by the given base station (e.g., uplink and downlink transmissions can be exchanged there between, . . . ), while other base stations in vicinity can generate interference.

Moreover, cooperation between base stations has become more commonly leveraged. In particular, multiple base stations in a wireless communication network can be interconnected, which can allow for sharing data between base stations, communicating there between, and so forth. For instance, in a wireless communication network deployment across a city, base stations included in the deployment can serve a set of mobile devices located within proximity of the base stations. Thus, multiple sources and/or destinations can be utilized as part of a cooperation strategy for transmission and reception of data, control signaling, and/or other information between devices in the wireless communication network. Use of multiple sources and/or destinations for respective transmissions can yield higher data rates, improved signal quality, and other such benefits. According to an example, the wireless communication network can be a network multiple-input multiple-output (N-MIMO) system or a coordinated multi-point (CoMP) system, in which a plurality of base stations can cooperate to exchange information with one or more mobile devices.

In an uplink N-MIMO system or uplink CoMP system, a mobile device can transmit an uplink signal to a plurality of base stations. Conventionally, mobile devices can be scheduled to transmit respective uplink signals to the plurality of base stations on overlapping sets of resources. Accordingly, high levels of interference oftentimes result from more than one mobile device leveraging a common set of resources for sending uplink signals. Moreover, resources utilized for transmitting an acknowledgment over the downlink to a mobile device (e.g., responsive to a received uplink signal, . . . ) commonly correspond to resources assigned to the mobile device and employed for transmitting the uplink signal. Thus, conventional techniques can result in the same resources being utilized for transmitting acknowledgments over the downlink to more than one mobile device. Since uplink signals can be sent by more than one mobile device, it can be desirable to send respective acknowledgments via different resources on the downlink to the more than one mobile device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating assignment of uplink resources for utilization by a mobile device for sending an uplink signal in an uplink coordinated multi-point (CoMP) wireless communication environment. For instance, a hopping tree can be defined across base stations, and neighboring base stations can schedule interfering mobile devices upon uplink resources mapped to different nodes from the hopping tree. By way of another example, a plurality of hopping trees can be employed across base stations in the uplink CoMP wireless communication environment. Moreover, an acknowledgment can be sent to the mobile device upon downlink resources identified as a function of the uplink resources. Further, the downlink resources can be distinct from disparate downlink resources utilized for sending an acknowledgment to a disparate mobile device from a neighboring base station.

According to related aspects, a method is described herein. The method can include coordinating with a neighboring base station to assign uplink resources for an uplink signal from a mobile device in an uplink coordinated multi-point environment. Further, the method can include signaling information that identifies the uplink resources to the mobile device.

Moreover, the method can include receiving the uplink signal from the mobile device upon the uplink resources.

Another aspect relates to a wireless communications apparatus. The wireless communications apparatus can include at least one processor. The at least one processor can be configured to assign uplink resources for an uplink signal from a mobile device by coordinating with a neighboring base station over a backhaul in an uplink coordinated multi-point environment. Moreover, the at least one processor can be configured to transmit information that indicates the uplink resources as assigned to the mobile device. Further, the at least one processor can be configured to obtain the uplink signal from the mobile device upon the uplink resources.

Yet another aspect relates to an apparatus. The apparatus can include means for cooperating with a neighboring base station to assign uplink resources corresponding to a node from a hopping tree to a mobile device for sending an uplink signal in a coordinated multi-point environment. Further, the apparatus can comprise means for signaling information that indicates the uplink resources to the mobile device. Moreover, the apparatus can include means for receiving the uplink signal from the mobile device upon the uplink resources.

Still another aspect relates to a computer program product that can comprise a computer-readable medium. The computer-readable medium can include code for causing at least one computer to cooperate with a neighboring base station to assign uplink resources corresponding to a node from a hopping tree to a mobile device for sending an uplink signal in a coordinated multi-point environment. Further, the computer-readable medium can include code for causing at least one computer to signal information that identifies the uplink resources to the mobile device. Moreover, the computer-readable medium can include code for causing at least one computer to receive the uplink signal from the mobile device upon the uplink resources.

Yet another aspect relates to an apparatus that can include a coordinated scheduling component that cooperates with a disparate base station to assign uplink resources to a mobile device for sending an uplink signal in an uplink coordinated multi-point environment. Further, the apparatus can include a reception component that receives the uplink signal sent by the mobile device. Moreover, the apparatus can include a channel estimation component that performs channel estimation based upon the uplink signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
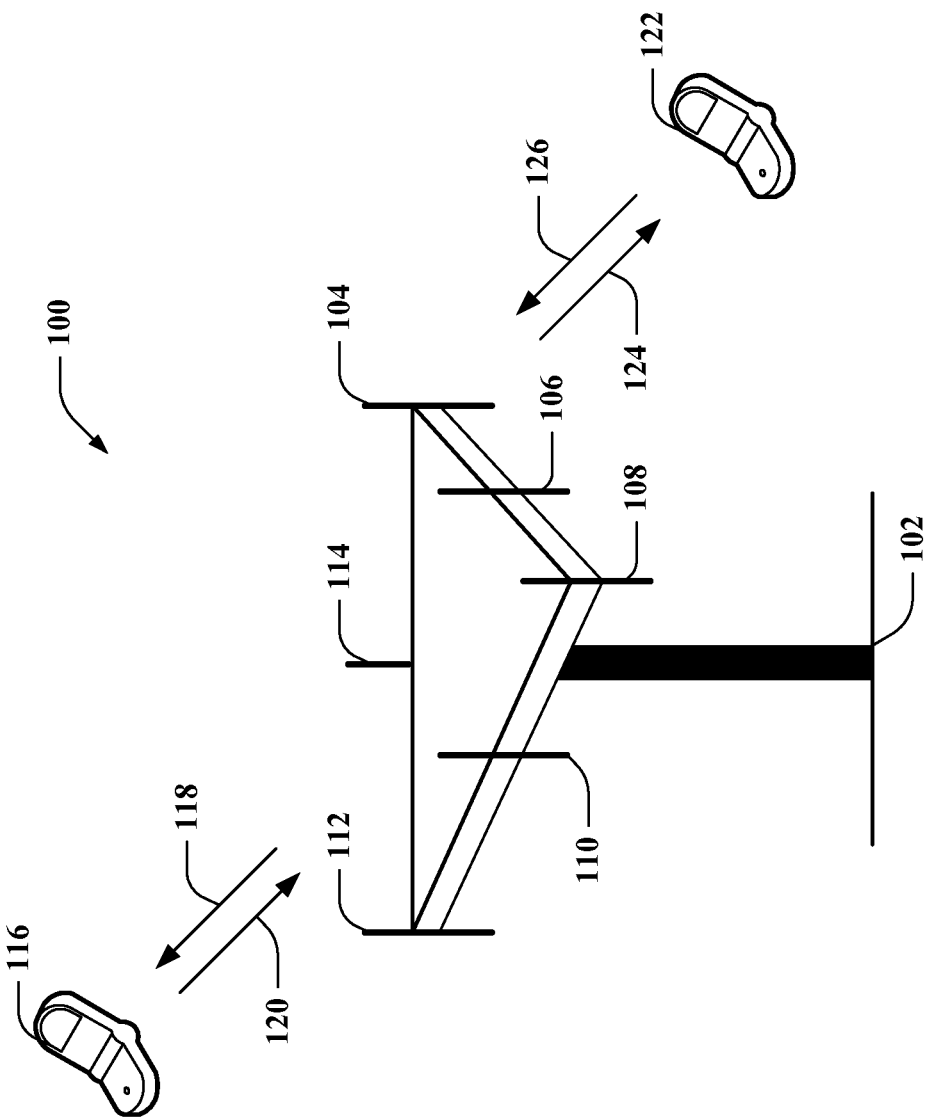
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. Wireless communication system 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 and mobile devices 116, 122 can be employed in a cooperative wireless communication environment such as, for instance, a coordinated multi-point (CoMP) environment (e.g., network multiple-input multiple-output (N-MIMO) environment, . . . ). For instance, base station 102 can be a macro cell base station, a pico cell base station, a femto cell base station, a micro cell base station, a relay, or the like. Moreover, disparate base station(s) (not shown) can be located nearby base station 102, and these neighbor base station(s) can be macro cell base station(s), pico cell base station(s), femto cell base station(s), micro cell base station(s), relay(s), a combination thereof, etc.

According to various aspects, mobile devices 116, 122 can each communicate with any suitable number of base stations (e.g., base station 102, disparate base station(s), . . . ). For example, mobile devices 116, 122 can each utilize one or more techniques such as N-MIMO, CoMP, and/or other techniques, by which a single mobile device 116, 122 is enabled to communicate with a plurality of base stations (e.g., base station 102, disparate base station(s), . . . ) and/or sectors thereof. Additionally or alternatively, communication between base station 102 and a mobile device (e.g., one of mobile devices 116, 122, . . . ) can result in strong dominant interference to other nearby base stations and/or mobile devices. For example, if a mobile device is located at an edge of a coverage area corresponding to base station 102 that serves the mobile device, communication between the mobile device and its serving base station 102 can cause interference to one or more other base stations within range of the mobile device with which the mobile device is not communicating under various circumstances. This can occur, for example, in a system that includes femto cell base stations if a mobile device is located within the coverage area of a femto cell base station, which in turn is embedded into a coverage area of a macro cell base station.

In accordance with another aspect, base stations (e.g., base station 102, disparate base station(s), . . . ) in wireless communication system 100 can coordinate pursuant to one or more cooperation strategies in order to increase data rates associated with communication with a given mobile device 116, 122 and/or to reduce interference caused to other base stations and/or mobile devices 116, 122 in wireless communication system 100. Pursuant to an example, respective sets of base stations (e.g., base station 102, disparate base station(s), . . . ) in wireless communication system 100 can jointly coordinate scheduling decisions for transmission of uplink signals by corresponding mobile devices 116, 122. Thus, for instance, a plurality of base stations can coordinate with each other (e.g., via the backhaul, . . . ) to select uplink resources to assign to a given mobile device (e.g., mobile device 116, mobile device 122, . . . ), and a particular one of the plurality of base stations can signal information identifying the assigned uplink resources to the given mobile device. Following this example, a jointly scheduled uplink signal sent by the given mobile device can be received by the plurality of base stations. Further, scheduling decisions can be coordinated among the plurality of base stations to control interference. In another example, various operational aspects of wireless communication system 100 such as base stations that cooperate to jointly coordinate scheduling decisions and receive uplink signals from respective mobile devices 116, 122 can be based at least in part on marginal utility calculations and/or any other suitable metric.

Employment of uplink CoMP can be transparent to mobile devices 116, 122. Accordingly, various optimizations as described herein can be supported by base station 102 (and any disparate base station(s)).

Figure 2:
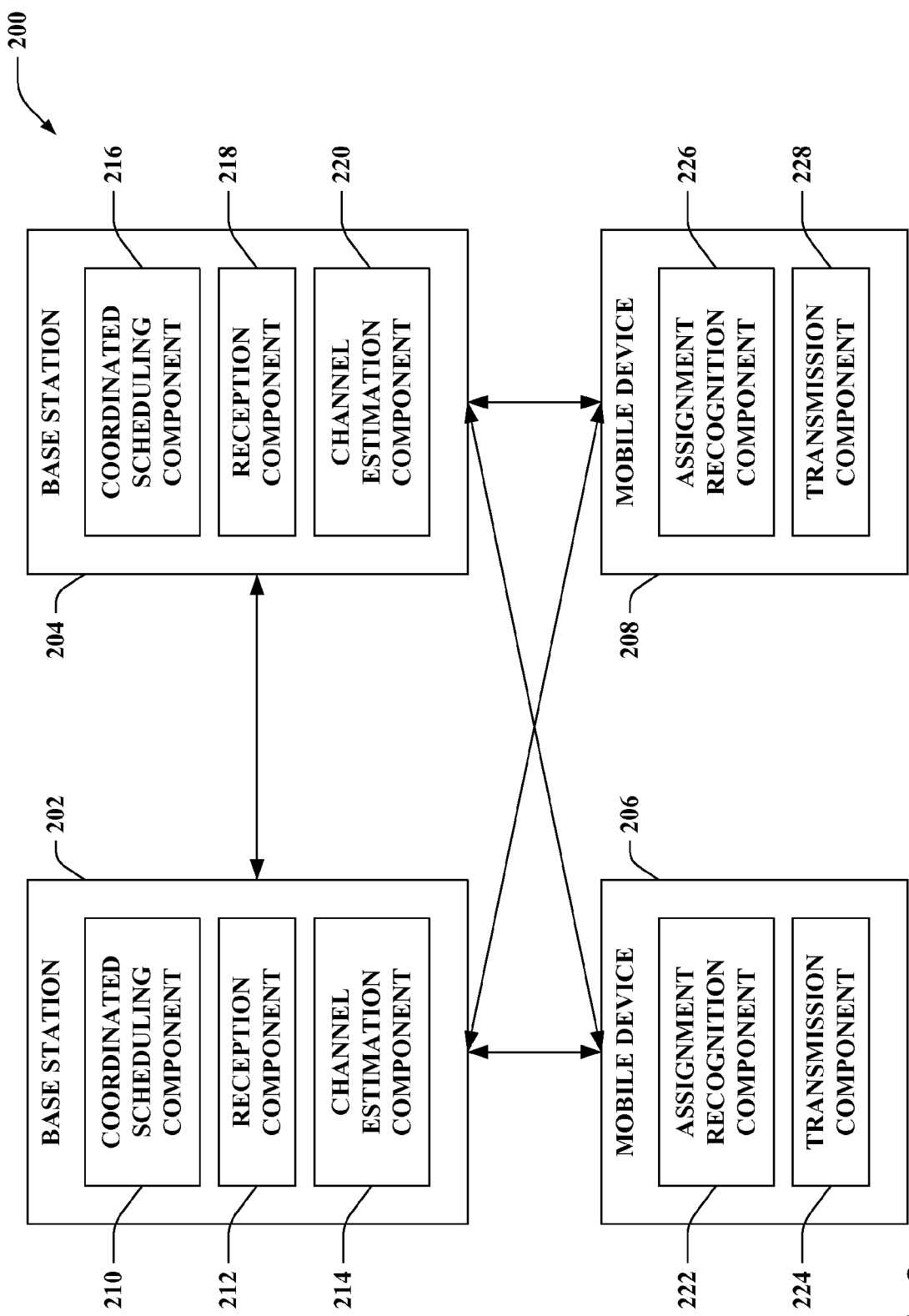
FIG. 2 is an illustration of an example system that coordinates scheduling for uplink CoMP in a wireless communication environment.

Now turning to FIG. 2, illustrated is a system 200 that coordinates scheduling for uplink CoMP in a wireless communication environment. System 200 includes a base station 202 and a base station 204. For instance, base station 202 and base station 204 can be neighboring base stations; however, the claimed subject matter is not so limited. Base station 202 and base station 204 can each transmit and/or receive information, signals, data, instructions, commands, bits, symbols, and the like. Base station 202 and/or base station 204 can communicate with a mobile device 206 and/or a mobile device 208 via the forward link and/or reverse link. Mobile device 206 and mobile device 208 can each transmit and/or receive information, signals, data, instructions, commands, bits, symbols, and the like. Moreover, although not shown, it is contemplated that any number of base stations similar to base station 202 and base station 204 can be included in system 200 and/or any number of mobile devices similar to mobile device 206 and mobile device 208 can be included in system 200. Further, it is contemplated that base station 202 and base station 204 can each be any type of base station (e.g., femto cell base station, pico cell base station, micro cell base station, macro cell base station, . . . ).

Base station 202 can include a coordinated scheduling component 210, a reception component 212, and a channel estimation component 214. Similarly, base station 204 can include a coordinated scheduling component 216, a reception component 218, and a channel estimation component 220. Moreover, mobile device 206 can include an assignment recognition component 222 and a transmission component 224. Similarly, mobile device 208 can include an assignment recognition component 226 and a transmission component 228.

Coordinated scheduling component 210 and coordinated scheduling component 216 can assign resources to mobile device 206 and/or mobile device 208 for utilization in connection with sending respective uplink signals. For example, the respective uplink signals sent over the assigned resources can be sounding reference signals (SRSs). Following this example, an SRS can be used as an uplink pilot. Moreover, the SRS can be employed for channel estimation. By way of another illustration, the respective uplink signals can be sent over an uplink control channel. For instance, the uplink control channel can be a Physical Random Access Channel (PRACH), an SRS, a Physical Uplink Control Channel (PUCCH) (e.g., PUCCH can be utilized to carry a Channel Quality Indicator (CQI), an acknowledgment, scheduling requests, . . . ), and so forth.

Coordinated scheduling component 210 and coordinated scheduling component 216 can cooperate (e.g., over a backhaul, . . . ) to assign respective resources to mobile device 206 and mobile device 208 to be leveraged for sending respective uplink signals (e.g., respective SRSs, . . . ). For instance, coordinated scheduling component 210 can transmit (e.g., over the downlink, . . . ) an assignment that indicates resources to be utilized by mobile device 206, and coordinated scheduling component 216 can transmit (e.g., over the downlink, . . . ) an assignment that indicates resources to be utilized by mobile device 208; however, it is to be appreciated that the claimed subject matter is not so limited (e.g., coordinated scheduling component 210 can transmit assignments to mobile device 206 and mobile device 208, coordinated scheduling component 216 can transmit assignments to mobile device 206 and mobile device 208, . . . ). Assignment recognition component 222 can detect resources allocated to mobile device 206 to be utilized for sending an uplink signal (e.g., SRS, . . . ). For example, assignment recognition component 222 can detect the allocated resources from the assignment received from base station 202. Further, transmission component 224 can send an uplink signal (e.g., SRS, . . . ) from mobile device 206 utilizing the detected resources. Similarly, assignment recognition component 226 can identify resources allotted to mobile device 208 to be employed for sending an uplink signal (e.g., SRS, . . . ). Pursuant to an example, assignment recognition component 226 can identify the allotted resources from the assignment received from base station 204. Moreover, transmission component 224 can send an uplink signal (e.g., SRS, . . . ) from mobile device 208 employing the identified resources.

Reception component 212 can obtain the uplink signal sent by mobile device 206 and/or the uplink signal sent by mobile device 208. Similarly, reception component 218 can obtain the uplink signal sent by mobile device 208 and/or the uplink signal sent by mobile device 206. Thus, the uplink signal transmitted by mobile device 206 and/or the uplink signal transmitted by mobile device 208 can be received at multiple points (e.g., by a plurality of base stations 202-204, . . . ) in an uplink CoMP environment; yet, it is to be appreciated that the claimed subject matter is not so limited.

Moreover, channel estimation component 214 and/or channel estimation component 220 can perform channel estimation based upon obtained uplink signal(s) (e.g., SRS(s), . . . ). According to an example, coordinated scheduling component 210 and coordinated scheduling component 216 can schedule transmission of the uplink signals (e.g., respective SRSs, . . . ) of interfering mobile devices (e.g., mobile device 206 and mobile device 208, . . . ) on different subframes and/or subbands to improve channel estimation quality yielded by channel estimation component 214 and/or channel estimation component 220. Following this example, a common hopping tree can be defined across base stations (e.g., defined across cells, . . . ); thus, base station 202 and base station 204 can utilize the common hopping tree for assigning resources. Further, coordinated scheduling component 210 and coordinated scheduling component 216 can cooperate to assign mobile device 206 and mobile device 208 to different nodes on the common hopping tree. Accordingly, by being assigned different nodes on the common hopping tree, mobile device 206 and mobile device 208 can utilize disparate resources for sending respective uplink signals (e.g., respective SRSs, . . . ).

Pursuant to another example, disparate hopping trees can be defined for utilization within system 200. Nodes of the hopping trees can map to corresponding resources (e.g., each node maps to a set of Resource Blocks (RBs) for a given period of time, . . . ). Thus, coordinated scheduling component 210 and/or coordinated scheduling component 216 can assign mobile device 206 to a particular node on a first hopping tree and can assign mobile device 208 to a particular node on a second hopping tree. According to an example, the respective nodes to which mobile device 206 and mobile device 208 are assigned can be linked to the same resources over time (e.g., same hopping sequence, . . . ) such that uplink signals are transmitted via the same resources by mobile device 206 and mobile device 208 over time. Following this example, mobile device 206 and mobile device 208 can be scheduled to hop jointly over time. By way of an alternative example, the respective nodes to which mobile device 206 and mobile device 208 are assigned can be linked to different resources over time (e.g., disparate hopping sequences, . . . ), and thus, interference between uplink signals sent by mobile device 206 and mobile device 208 can be randomized. According to such example, mobile device 206 and mobile device 208 can hop randomly over time with respect to each other.

While many of the examples described herein relate to utilization of hopping trees (e.g., channel trees, . . . ), it is to be appreciated that any mapping procedure is intended to fall within the scope of the hereto appended claims. For instance, another example of a mapping procedure that can be leveraged in connection with the claimed subject matter is bit mapping; however, the claimed subject matter is not so limited.

Figure 3:
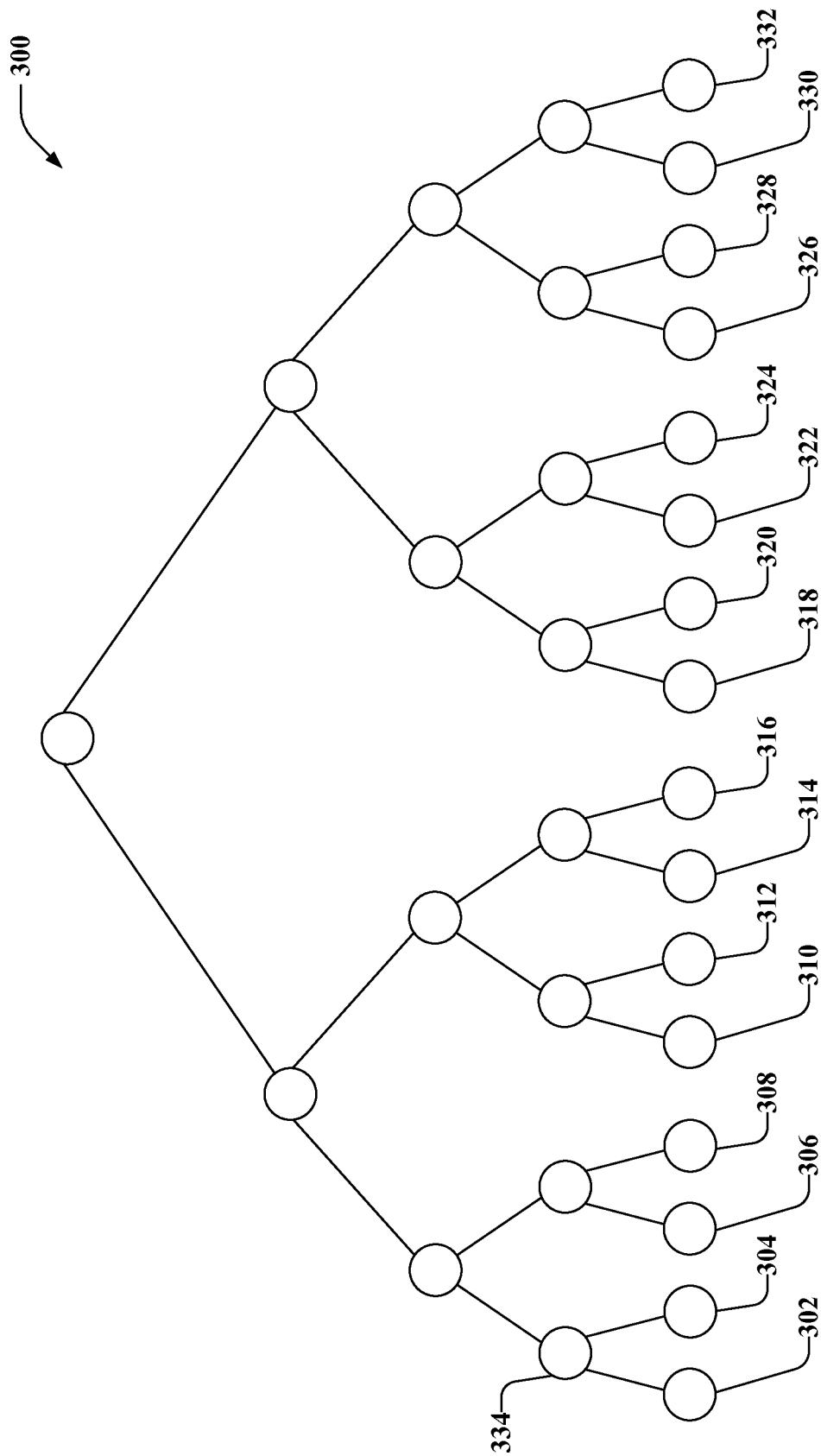
FIG. 3 is an illustration of an example hopping tree in accordance with various aspects set forth herein.

Turning to FIG. 3, illustrated is an example hopping tree 300. Hopping tree 300 can be utilized by a base station (e.g., base station 202 of FIG. 2, base station 204 of FIG. 2, . . . ) in connection with allocating resources on an uplink within a wireless communication environment that supports CoMP. Nodes of hopping tree 300 can map to corresponding sets of RBs at a given time.

As depicted, hopping tree 300 can include sixteen base nodes 302-332. It is to be appreciated, however, that a hopping tree leveraged in connection with the claimed subject matter can include substantially any number of base nodes and/or is not limited to the structure depicted in FIG. 3.

Each base node 302-332 can map to a respective set of RBs at a given time. Moreover, at different times or frames, base nodes 302-332 can map to different respective sets of RBs to provide for frequency hopping. Further, sets of RBs can be non-overlapping. Thus, base nodes 302-332 map orthogonally such that no two base nodes (e.g., from base nodes 302-322, . . . ) map to the same physical resource at the same time (e.g., an RB is not mapped to more than one base node from base nodes 302-322 at a given time, . . . ).

Each node in hopping tree 300 can be associated with a channel identifier (ID). When a node is assigned to a mobile device, a channel ID for such node can be communicated to the mobile device. A mobile device can be assigned one or more nodes from hopping tree 300. For instance, if a mobile device is sent an assignment corresponding to base node 302, then the mobile device can transmit an uplink signal (e.g., SRS, . . . ) utilizing a corresponding set of RBs pertaining to base node 302. By way of another illustration, a mobile device can be assigned a higher level node. Following this illustration, if the mobile device is assigned to node 334, then the mobile device can transmit an uplink signal (e.g., SRS, . . . ) employing corresponding sets of RBs pertaining to base node 302 and base node 304. Further, it is contemplated that the claimed subject matter is not limited to the foregoing examples.

Pursuant to an example, hopping tree 300 can be defined across base stations (e.g., defined across cells, . . . ) in a wireless communication environment that leverages uplink CoMP. Following this example, neighboring base stations can cooperate to identify interfering mobile devices. Moreover, the interfering mobile devices can be assigned to different nodes on hopping tree 300. Accordingly, the interfering mobile devices can utilize different sets of RBs when sending respective uplink signals (e.g., respective SRSs, . . . ). By way of another illustration, legacy mobile device(s) (e.g., legacy user(s), . . . ) can be scheduled on one subframe for SRS, while for non-legacy mobile device(s) (e.g., non-legacy user(s), . . . ), fake cell ID based hopping can be supported. Moreover, it is contemplated that the foregoing can be extended for use on the downlink in Time Division Duplex (TDD); yet, the claimed subject matter is not so limited.

By way of another example, a plurality of hopping trees can be defined in an uplink CoMP wireless communication environment and used by a plurality of base stations (e.g., a plurality of cells, . . . ), where the plurality of hopping trees can be similar to hopping tree 300. For purposes of illustration, a case where two hopping trees can be employed by two base stations is considered; yet, it is contemplated that such illustration can be extended to other numbers of hopping trees and/or other numbers of base stations. Moreover, the two base stations can cooperate to assign a first mobile device to a node from a first hopping tree and a second mobile device to a node from a second hopping tree. It is contemplated that the node from the first hopping tree assigned to the first mobile device and the node from the second hopping tree assigned to the second mobile device can map to the same physical resources (e.g., common set of RBs, . . . ) or different physical resources (e.g., differing sets of RBs, . . . ). Thus, mobile devices with disparate serving base stations can be assigned the same physical resources or different physical resources.

Following the aforementioned example, the plurality of hopping trees can each map to the same overall bandwidth. For instance, if 10 MHz of bandwidth is available for use in a wireless communication environment, then the plurality of hopping trees can each map nodes to corresponding sets of RBs from the same 10 MHz.

Moreover, according to an example where two hopping trees are leveraged, a set of RBs corresponding to node 0 on a first hopping tree can be the same as a set of RBs corresponding to node 0 on a second hopping tree over time (e.g., two parallel hopping trees can be defined, . . . ). For instance, a mobile device assigned a channel ID 0 (e.g., associated with node 0 from the first hopping tree, . . . ) by a first base station can collide with another mobile device assigned a channel ID 0 (e.g., associated with node 0 from the second hopping tree, . . . ) by a second base station. Accordingly, the mobile devices scheduled on different cells can hop jointly under such scenario.

By way of another example where two hopping trees are employed, a set of RBs corresponding to node 0 on a first hopping tree can be similar to a set of RBs corresponding to node 1 on a second hopping tree during a first time period. Further, during a second time period, a set of RBs corresponding to node 0 on the first hopping tree can be similar to a set of RBs corresponding to node 3 on the second hopping tree, and so forth. Thus, the hopping trees can implement differing hopping sequences to randomize interference, and accordingly, mobile devices scheduled on different cells can hop randomly with respect to each other.

Figure 4:
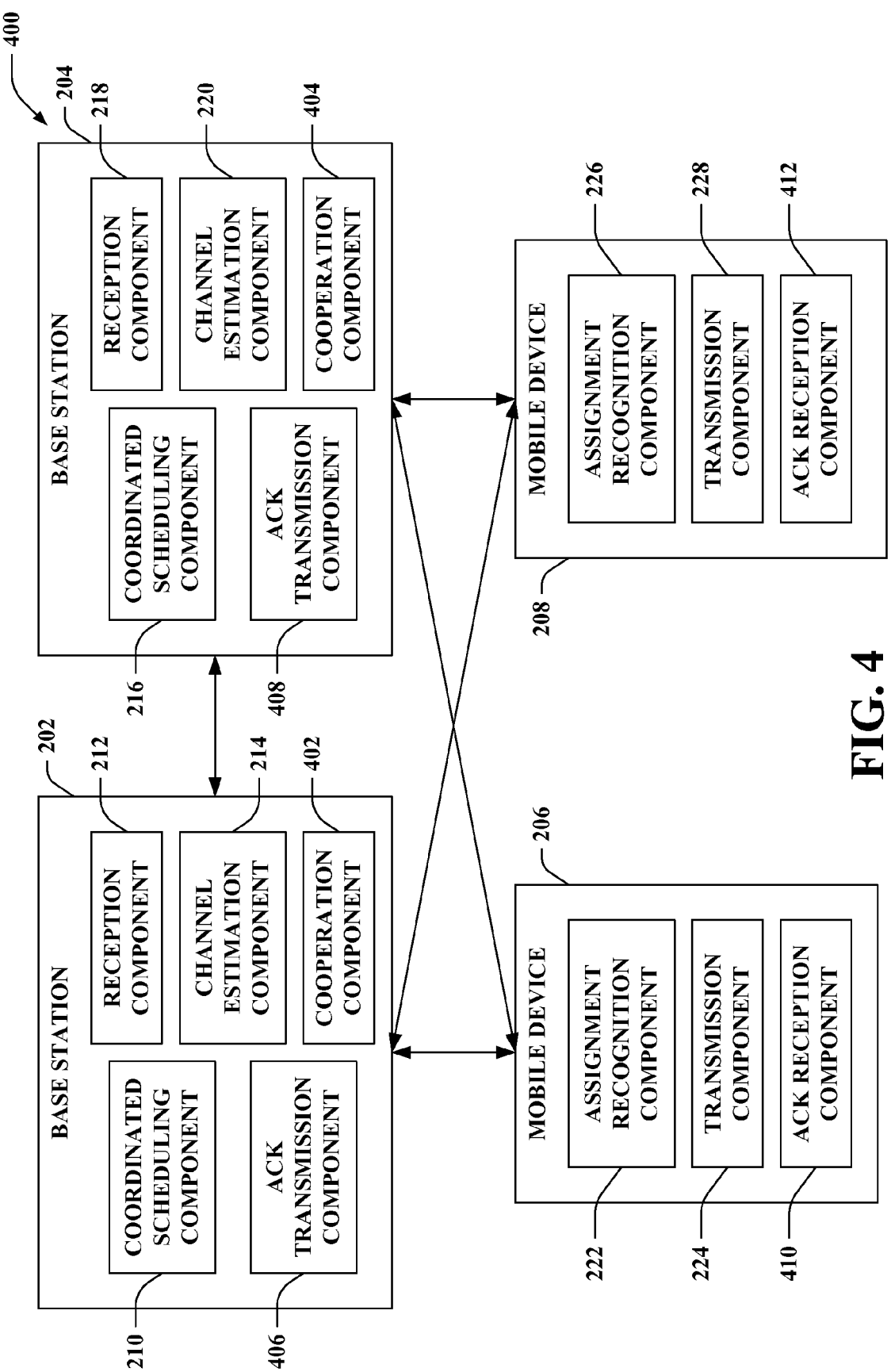
FIG. 4 is an illustration of an example system that coordinates operation between base stations and/or exchanges acknowledgements in a wireless communication environment that leverages uplink CoMP.

Now referring to FIG. 4, illustrated is a system 400 that coordinates operation between base stations and/or exchanges acknowledgements in a wireless communication environment that leverages uplink CoMP. System 400 includes a plurality of base stations (e.g., base station 202 and base station 204, . . . ) and a plurality of mobile devices (e.g., mobile device 206 and mobile device 208, . . . ). As described herein, base station 202 can include coordinated scheduling component 210, reception component 212, and channel estimation component 214, and similarly, base station 204 can include coordinated scheduling component 216, reception component 218, and channel estimation component 220. Moreover, mobile device 206 can include assignment recognition component 222 and transmission component 224, and mobile device 208 can include assignment recognition component 226 and transmission component 228.

Base station 202 and base station 204 (and/or any disparate base station(s)) can coordinate operation to yield a cooperation strategy for communication with mobile device 206 and mobile device 208 (and/or any disparate mobile device(s)). As such, base station 202 can include a cooperation component 402 and base station 204 can include a cooperation component 404. Cooperation component 402 and cooperation component 404 can coordinate operation of base station 202 and base station 204 to effectuate one or more cooperation techniques. For example, a cooperation technique can be leveraged whereby mobile device 206 and/or mobile device 208 are cooperatively served by base station 202 and base station 204. Hence, virtual MIMO can be carried out as managed by cooperation component 402 and cooperation component 404, effectively treating base station 202 and base station 204 as one base station. However, it is to be appreciated that the claimed subject matter is not so limited.

Cooperation strategies supported by cooperation component 402 and cooperation component 404 can enable base station 202 and base station 204 to pool together resources, antennas, and the like. Further, such cooperation strategies can allow for joint scheduling handled by base station 202 and base station 204 (e.g., by coordinated scheduling component 210 and coordinated scheduling component 216, . . . ) included in a common cooperation strategy. Moreover, information can be shared between base station 202 and base station 204 in the common cooperation strategy. For instance, the shared information can include channel information (e.g., for channel(s) between base station(s) and mobile device(s) in the common cooperation strategy, . . . ), packets (e.g., received from mobile device 206 and/or mobile device 208 in the common cooperation strategy, . . . ), and so forth. Hence, base station 202 and base station 204 can cooperate with each other; yet, base station 202 and base station 204 need not cooperate with a base station included in a different cooperation strategy.

Cooperation component 402 and cooperation component 404 (and/or coordinated scheduling component 210 and coordinated scheduling component 216) can coordinate respective transmissions between base station 202, base station 204, mobile device 206 and/or mobile device 208 (and/or any disparate base stations(s) and/or mobile device(s)) in system 400. In general, cooperation component 402 and cooperation component 404 can be utilized by base station 202 and base station 204, respectively, to compute and/or make scheduling decisions related to node clustering, scheduling, and so on. To these ends, cooperation component 402 and cooperation component 404 can schedule respective nodes to be utilized for communication with mobile device 206 and/or mobile device 208, determine a form of cooperation to implement for communication with mobile device 206 and/or mobile device 208, and so forth.

In accordance with various aspects, a cooperation strategy can be selected by cooperation component 402 and cooperation component 404 based on factors such as mobile device mobility, carrier to interference (C/I) levels associated with mobile device 206 and/or mobile device 208, capabilities of backhaul links between base station 202 and base station 204 (and/or any disparate base station(s)), or the like. In accordance with other aspects, a projected rate associated with respective mobile devices (e.g., mobile device 206, mobile device 208, disparate mobile device(s), . . . ) can be utilized along with factors such as backhaul bandwidth, latency constraints, or the like, to select between respective cooperation techniques.

Moreover, base station 202 can include an acknowledgment (ACK) transmission component 406, and similarly, base station 204 can include an ACK transmission component 408. ACK transmission component 406 and ACK transmission component 408 can cause acknowledgments to be sent over the downlink to mobile device 206 and mobile device 208. Further, mobile device 206 can include an ACK reception component 410, and mobile device 208 can include an ACK reception component 412. ACK reception component 410 can recognize and obtain an acknowledgment sent over the downlink for mobile device 206 and ACK reception component 412 can recognize and obtain an acknowledgement sent over the downlink for mobile device 208.

ACK transmission component 406 and ACK transmission component 408 can select resources on the downlink to utilize for sending respective acknowledgments. Moreover, ACK reception component 410 can identify resources on the downlink upon which an acknowledgment for mobile device 206 can be carried and ACK reception component 412 can identify resources on the downlink upon which an acknowledgment for mobile device 208 can be carried. Accordingly, resources on the downlink employed for sending an acknowledgment can be linked to an assignment for an uplink signal to which the acknowledgment is responsive. More particularly, the resources utilized for an acknowledgment can be mapped to a hopping tree and a node from the hopping tree allotted for the uplink signal (e.g., as provided by coordinated scheduling component 210 and/or coordinated scheduling component 216, . . . ). Thus, extra bit(s) can be introduced in the identification of assignments, where the extra bit(s) can pertain to a corresponding hopping tree which includes the node allotted for the uplink signal. The extra bit(s) can allow for distinguishing between mobile devices regardless whether such mobile devices are assigned to the same or different physical resources for sending respective uplink signals. According to an example, a channel ID can include the extra bit(s) that point to the hopping tree, which can allow for separately acknowledging uplink signals sent by mobile device 206 and mobile device 208 regardless whether such uplink signals are sent upon the same or different uplink resources.

Coordinated scheduling component 210 and coordinated scheduling component 216 can cooperate to assign a node from a first hopping tree to mobile device 206 and a node from a second hopping tree to mobile device 208. Mobile device 206 and mobile device 208 can recognize corresponding resources associated with the node respectively assigned thereto. Thus, mobile device 206 (e.g., transmission component 224, . . . ) can send an uplink signal (e.g., SRS, . . . ) upon resources corresponding to the assigned node from the first hopping tree, and mobile device 208 (e.g., transmission component 228, . . . ) can send an uplink signal (e.g., SRS, . . . ) upon resources corresponding to the assigned node from the second hopping tree. Moreover, regardless whether mobile device 206 and mobile device 208 transmit respective uplink signals upon the same or different resources, separate acknowledgments can be sent over the downlink.

According to an example, the node from the first hopping tree and the node from the second hopping tree can map to the same physical resources over time (e.g., mobile device 206 and mobile device 208 can hop together over time, . . . ). For instance, mobile devices (e.g., mobile device 206 and mobile device 208, . . . ) with disparate serving base stations (e.g., base station 202 and base station 204, . . . ) can be assigned the same resources using multi-user MIMO (MU-MIMO). This can be effectuated by use of explicit hopping mode (e.g., with cell-based hopping disabled, . . . ) with both base stations (e.g., base station 202 and base station 204, both cells, . . . ). Moreover, for acknowledgment purposes, acknowledgments sent by ACK transmission component 406 and ACK transmission component 408 can be linked to resources respectively assigned to mobile device 206 and mobile device 208. Although the assigned nodes can map to the same physical resources, since mobile device 206 and mobile device 208 are allotted nodes from differing hopping trees in the aforementioned example, the assignments can be distinguished. Hence, differing resources can be utilized for exchanging acknowledgments over the downlink (e.g., as sent by ACK transmission component 406 and/or ACK transmission component 408 and obtained by ACK reception component 410 and/or ACK reception component 412, . . . ).

By way of another example, the node from the first hopping tree and the node from the second hopping tree can map to different physical resources over time. Thus, frequency diversity (e.g., for MU-MIMO, . . . ) associated with transmission of uplink signals from mobile device 206 and mobile device 208 can be yielded. Various hopping schemes can be implemented to provide such frequency diversity. Examples of hopping schemes can include implicit hopping mode with cell-specific hopping, cluster-based hopping, subband hopping, and so forth. For instance, different hopping sequences can be defined based upon cell ID and/or an identity of a cluster (e.g., a CoMP cluster, a cluster can include a set of base stations and a set of mobile devices, . . . ). Moreover, resources employed for exchanging acknowledgments over the downlink (e.g., as sent by ACK transmission component 406 and/or ACK transmission component 408 and obtained by ACK reception component 410 and/or ACK reception component 412, . . . ) can be linked to the respective physical resources assigned for uplink signals (e.g., pertaining to assigned hopping tree and node from the assigned hopping tree, . . . ).

Pursuant to an illustration, CoMP cells (e.g., base station 202, base station 204, . . . ) can be grouped into clusters. Coordination can be enabled within a particular cluster, while coordination can be lacking across clusters. As an example, a cluster can be a set of interconnected Remote Radio Heads (RRHs). Further, a hopping sequence can be defined as a series (e.g., product, . . . ) of a cell-specific permutation and a cluster-specific (e.g., common across base stations within a cluster, . . . ) permutation. Cluster-specific permutations are different across different clusters. Further, cell-specific permutations can be either the same for a given cluster (e.g., for common hopping, . . . ) or randomized (e.g., for independent hopping, . . . ).

According to other aspects, as a dedicated reference signal (DRS) is channelized based on the serving cell ID (e.g., corresponding to base station 202, base station 204, . . . ), pilots may not be orthogonal. Thus, base station 202 and base station 204 (e.g., receiving cells, . . . ) can use pilot interference cancellation to improve channel estimation signal to noise ratio (SNR) (e.g., yielded by channel estimation component 214 and channel estimation component 220, . . . ). Moreover, utilization of different hopping trees can allow for employing different pilot offsets. For instance, a pilot offset can be linked to a hopping tree (e.g., a first hopping tree can be associated with a pilot offset of 0 and a second hopping tree can be associated with a pilot offset of 1, . . . ). The pilot offsets can be designed to yield pilot patterns that are orthogonal in time or frequency. Thus, in the context of multi-cell transmission (e.g., associated with uplink CoMP, . . . ), different pilot offsets that are orthogonal to each other can be leveraged to provide orthogonalization across cells (e.g., across base stations, . . . ), which typically does not exist when employing conventional techniques. According to another example, orthogonal pilots can be obtained by implementing Zadoff-Chu sequences (e.g., mobile device 206 or mobile device 208 can be assigned a Zadoff-Chu sequence corresponding to a non-serving cell, . . . ) in a non-backward compatible case (e.g., Zadoff-Chu sequences can also be referred to as Chu sequences, . . . ); however, the claimed subject matter is not so limited.

Figure 5:
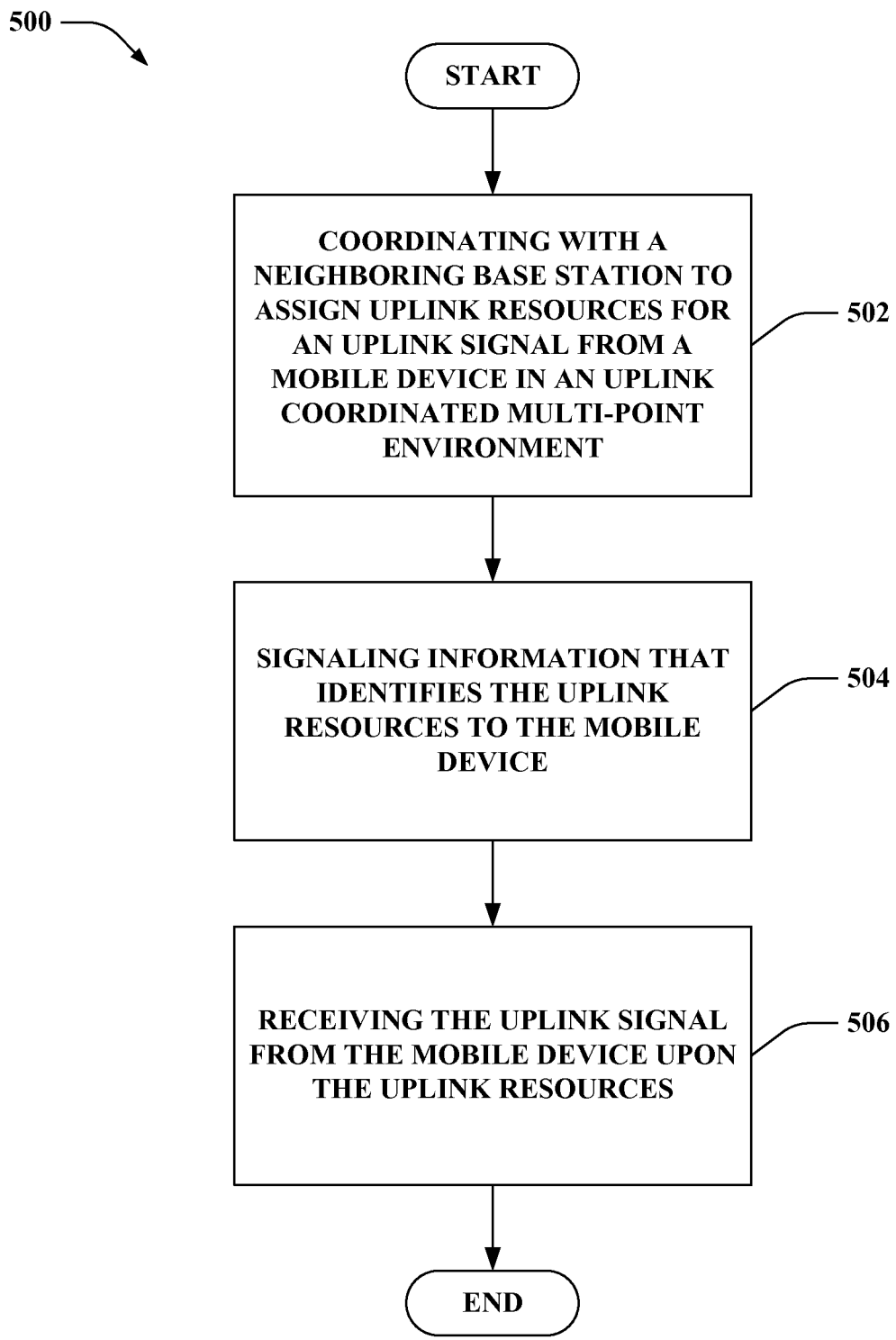
FIG. 5 is an illustration of an example methodology that facilitates scheduling uplink transmissions in an uplink CoMP wireless communication environment.
Figure 6:
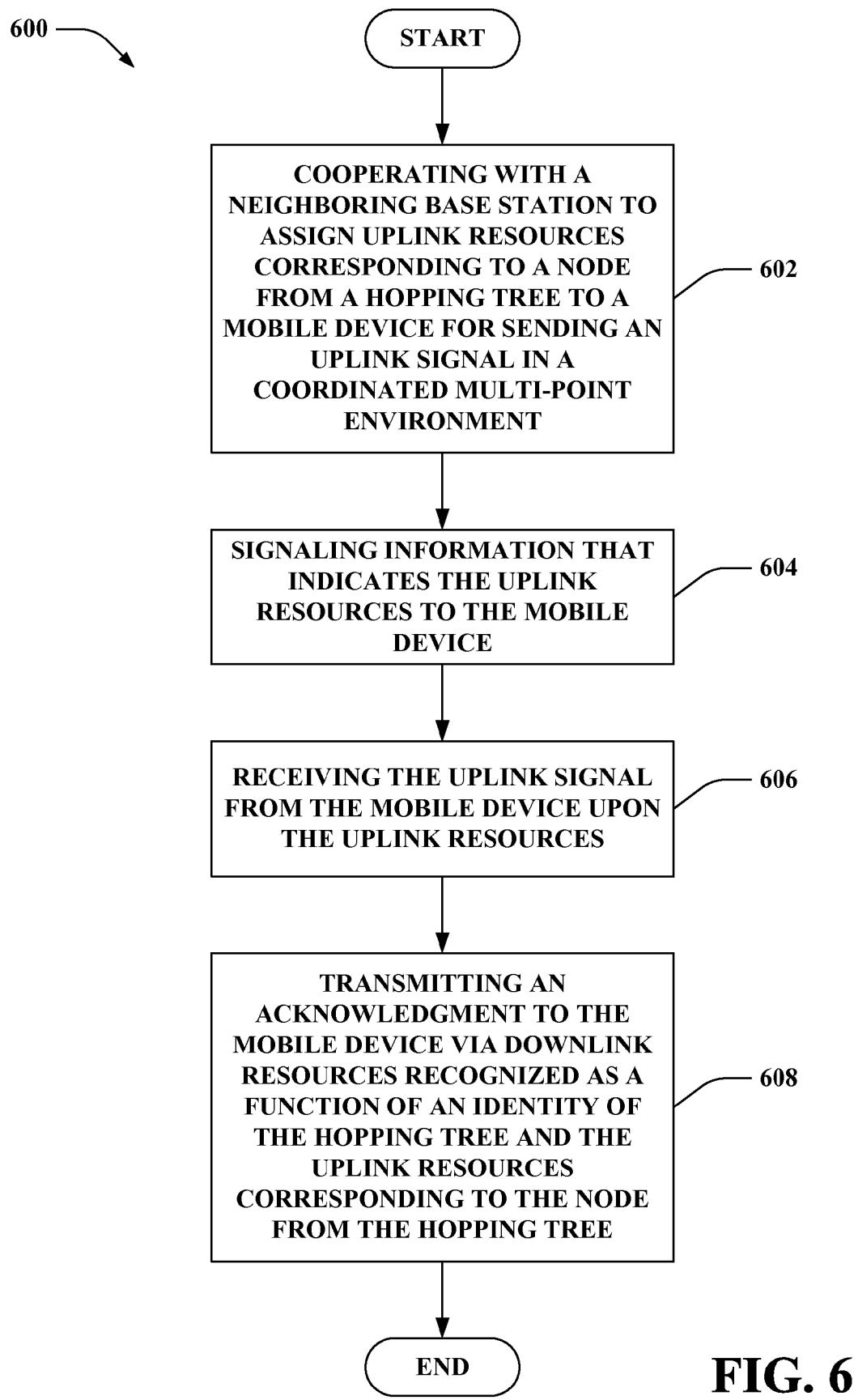
FIG. 6 is an illustration of an example methodology that facilitates employing a plurality of hopping trees across base stations in an uplink CoMP wireless communication environment.

Referring to FIGS. 5-6, methodologies relating to enhancing uplink CoMP in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates scheduling uplink transmissions in an uplink CoMP wireless communication environment. At 502, coordinating with a neighboring base station can be effectuated to assign uplink resources for an uplink signal from a mobile device in an uplink coordinated multi-point (CoMP) environment. By way of example, coordination with the neighboring base station can be leveraged to schedule the uplink signal from the mobile device and a disparate uplink signal from an interfering mobile device on different subframes or subbands; however, the claimed subject matter is not so limited. At 504, information that identifies the uplink resources can be signaled to the mobile device.

At 506, the uplink signal can be received from the mobile device upon the uplink resources. For instance, the uplink signal can be a sounding reference signal (SRS). Further, the SRS can be an uplink pilot. Thus, the SRS can be evaluated for channel estimation.

According to an example, an acknowledgment can be transmitted to the mobile device via downlink resources identified as a function of the uplink resources, wherein the downlink resources can be distinct from disparate downlink resources utilized for transmitting an acknowledgment to a disparate mobile device from the neighboring base station. Thus, regardless whether the uplink resources employed by the mobile device are substantially similar to or different from uplink resources assigned to the disparate mobile device for a disparate uplink signal, the downlink resources used for the acknowledgment for the mobile device differ from the disparate downlink resources used for the acknowledgment for the disparate mobile device.

According to another example, a hopping tree can be defined across base stations in the uplink CoMP environment. For instance, the mobile device and a disparate mobile device can be identified as interfering with each other. Following this example, coordination with the neighboring base station can be effectuated to assign the mobile device to a first node of the hopping tree and the disparate mobile device to a second node of the hopping tree, where the first node can map to the uplink resources and the second node can map to disparate, non-overlapping uplink resources. It is to be appreciated, however, that the claimed subject matter is not limited to the foregoing example.

By way of another example, the uplink signal can be a pilot. Following this example, pilot interference cancellation can be implemented to improve channel estimation SNR. Further, orthogonal pilots can be utilized in the uplink CoMP environment; thus, for instance, orthogonalization across base stations can be yielded by employing Zadoff-Chu sequences. Accordingly, a Zadoff-Chu sequence corresponding to a non-serving base station (e.g., non-serving cell, . . . ) can be assigned to the mobile device to orthogonalize the pilot. Yet, it is contemplated that the claimed subject matter is not so limited.

With reference to FIG. 6, illustrated is a methodology 600 that facilitates employing a plurality of hopping trees across base stations in an uplink CoMP wireless communication environment. At 602, cooperating with a neighboring base station can be effectuated to assign uplink resources corresponding to a node from a hopping tree to a mobile device for sending an uplink signal in a coordinated multi-point (CoMP) environment. Moreover, uplink resources corresponding to a node from a disparate hopping tree can be assigned to a disparate mobile device for sending a disparate uplink signal.

According to an example, the node from the hopping tree and the node from the disparate hopping tree can map to substantially similar uplink resources over time. Following this example, the hopping tree and the disparate hopping tree can enable the mobile device and the disparate mobile device to jointly hop. By way of another example, the node from the hopping tree and the node from the disparate hopping tree can map to different uplink resources over time. Pursuant to this example, different hopping sequences can be utilized by the hopping tree and the disparate hopping tree. For instance, cell-specific hopping sequences, cluster-based hopping sequences, or the like can be utilized. By way of another illustration, the different hopping sequences can each be defined as a series (e.g., product, . . . ) of a cell-specific permutation (e.g., cell-specific hopping sequence, . . . ) and a cluster-specific permutation (e.g., cluster-based hopping sequence, . . . ). Yet, it is contemplated that the claimed subject matter is not so limited.

At 604, information that indicates the uplink resources can be signaled to the mobile device. At 606, the uplink signal can be received from the mobile device upon the uplink resources. For example, the uplink signal can be an SRS, which can be utilized as an uplink pilot for channel estimation.

At 608, an acknowledgment can be transmitted to the mobile device via downlink resources recognized as a function of an identity of the hopping tree and the uplink resources corresponding to the node from the hopping tree. For instance, if two hopping tree are employed in the CoMP environment, an extra bit that points to the identity of the hopping tree can be included in a channel identifier, wherein the downlink resources can be a function of the channel identifier with the extra bit; yet, the claimed subject matter is not so limited. Thus, regardless whether the uplink resources corresponding to the node from the hopping tree and the uplink resources corresponding to the node from the disparate hopping tree are substantially similar (e.g., jointly hop, . . . ) or different (e.g., randomly hop, . . . ) over time, the downlink resources used for the acknowledgment for the mobile device differ from disparate downlink resources used for an acknowledgment for the disparate mobile device.

It will be appreciated that, in accordance with one or more aspects described herein, inferences can be made assigning uplink resources and/or differentiating acknowledgments in an uplink CoMP wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
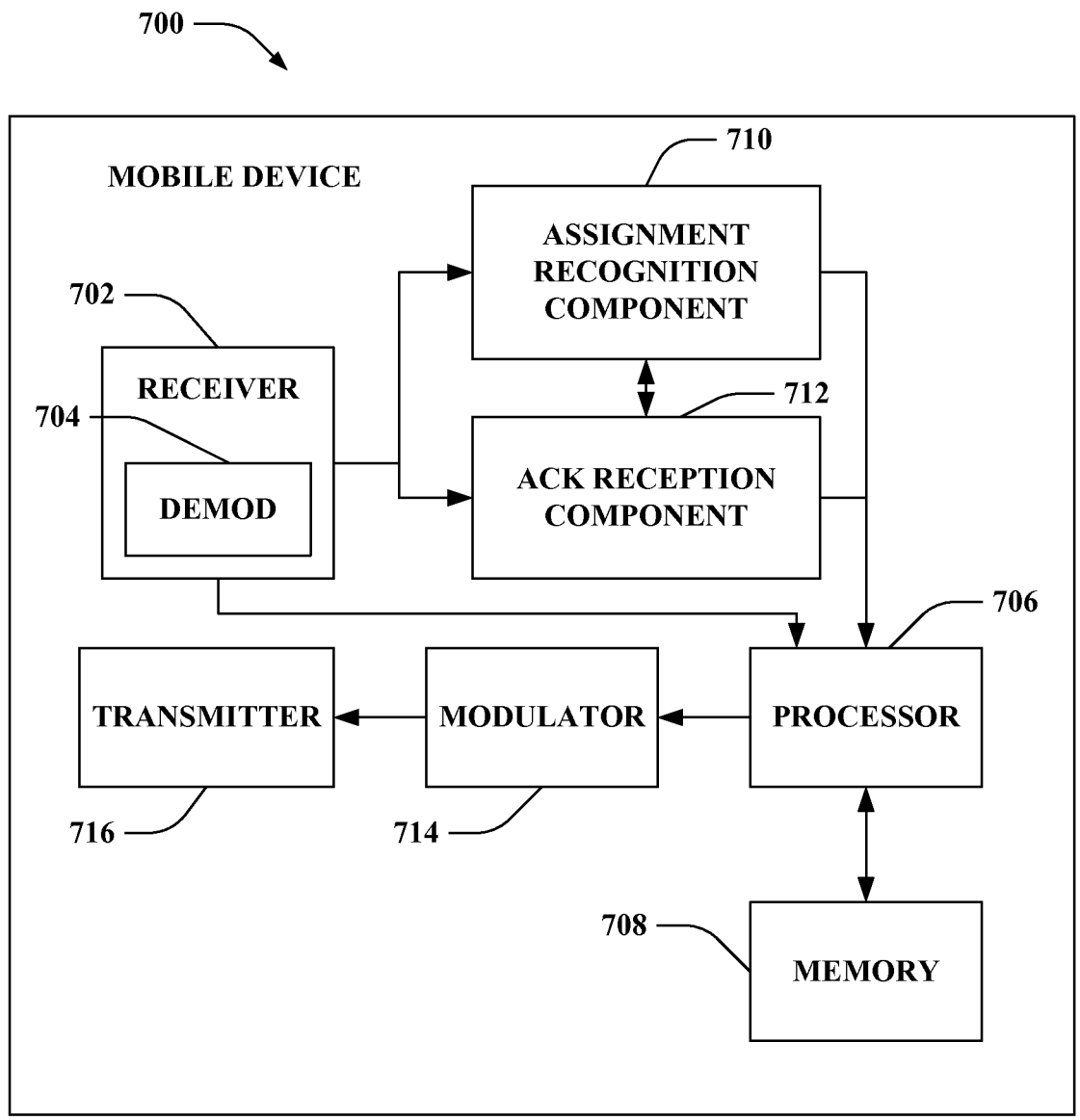
FIG. 7 is an illustration of an example mobile device that receives acknowledgments in an uplink CoMP wireless communication system.

According to an example, one or more methods presented above can include making inferences pertaining to determining downlink resources for an acknowledgment. By way of further illustration, an inference can be made related to identifying uplink resources to assign to a mobile device to employ in a CoMP environment. It will be appreciated that the foregoing examples are illustrative in nature and are not intended to limit the number of inferences that can be made or the manner in which such inferences are made in conjunction with the various embodiments and/or methods described herein.

FIG. 7 is an illustration of a mobile device 700 that receives acknowledgments in an uplink CoMP wireless communication system. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716 (e.g., transmission component 224 of FIG. 2, transmission component 224 of FIG. 2, ... ), a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, and any other suitable information related to performing the various actions and functions set forth herein. Memory 708, for instance, can store protocols and/or algorithms associated with identifying uplink resources allotted to mobile device 700 for transmission of an uplink signal, recognizing downlink resources upon which an acknowledgment can be sent, monitoring such downlink resources to detect an acknowledgment, and so forth.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can be operatively coupled to an assignment recognition component 710 and/or an ACK reception component 712. Assignment recognition component 710 can be substantially similar to assignment recognition component 222 of FIG. 2 and/or assignment recognition component 226 of FIG. 2. Moreover, ACK reception component 712 can be substantially similar to ACK reception component 410 of FIG. 4 and/or ACK reception component 412 of FIG. 4. Assignment recognition component 710 can obtain an assignment and detect uplink resources allocated to mobile device 700 for sending an uplink signal (e.g., SRS, ... ). Moreover, the uplink resources can be employed to send such uplink signal (e.g., via transmitter 716, ... ). In response to sending the uplink signal, ACK reception component 712 can recognize downlink resources to be employed for sending an acknowledgment and can monitor the downlink resources for the acknowledgment. Mobile device 700 still further comprises a modulator 714 and a transmitter 716 that transmits data, signals, etc. to a base station. Although depicted as being separate from the processor 706, it is to be appreciated that assignment recognition component 710, ACK reception component 712 and/or modulator 714 can be part of processor 706 or a number of processors (not shown).

Figure 8:
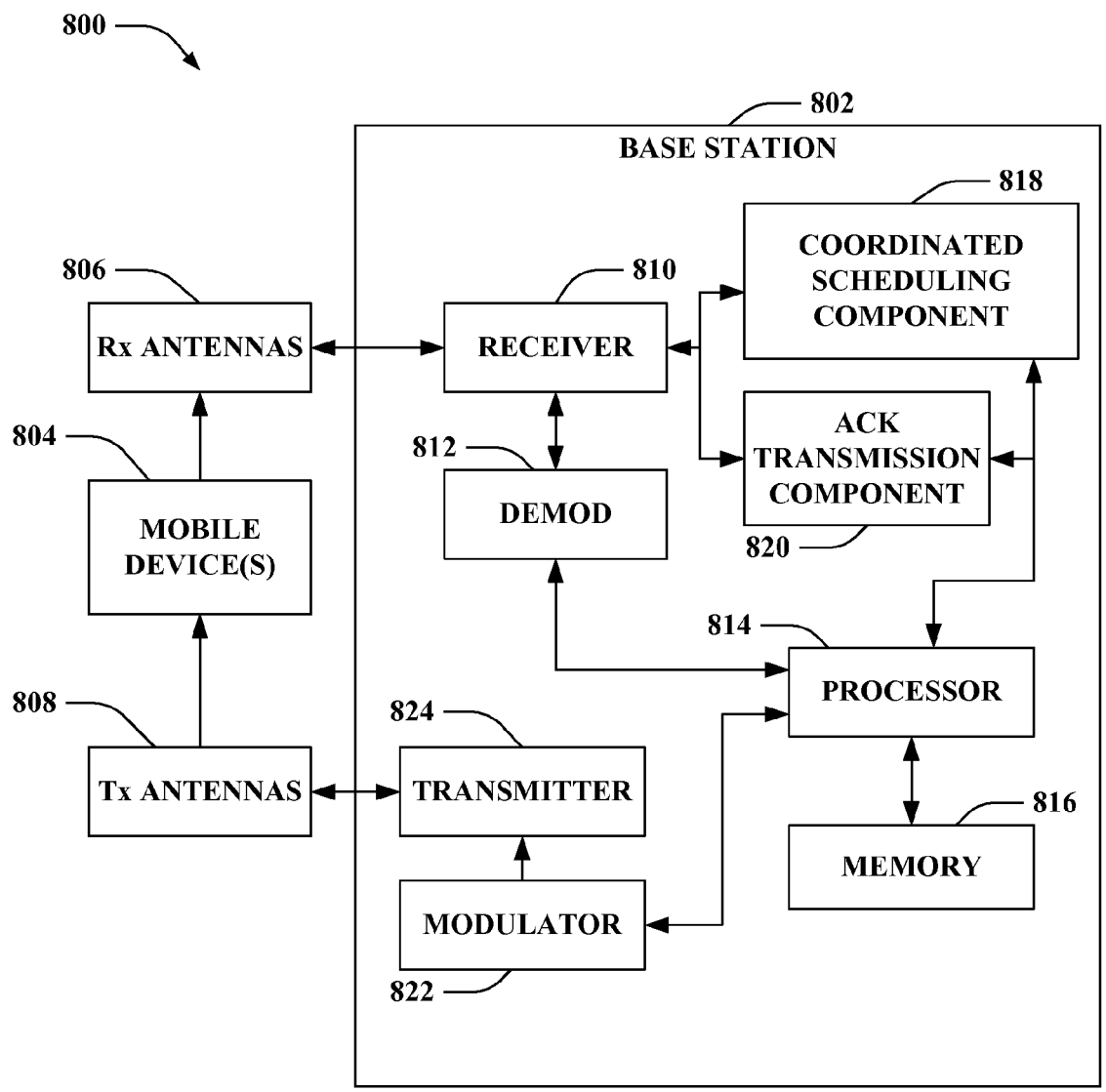
FIG. 8 is an illustration of an example system that schedules uplink signals in an uplink CoMP wireless communication environment.

FIG. 8 is an illustration of a system 800 that schedules uplink signals in an uplink CoMP wireless communication environment. System 800 comprises a base station 802 (e.g., access point, ... ) with a receiver 810 (e.g., reception component 212 of FIG. 2, reception component 218 of FIG. 2, ... ) that receives signal(s) from one or more mobile devices 804 through a plurality of receive antennas 806, and a transmitter 824 that transmits to the one or more mobile devices 804 through a transmit antenna 808. Moreover, base station 802 can receive signal(s) with receiver 810 from one or more disparate base stations through the plurality of receive antennas 806 and/or transmit to one or more disparate base stations with transmitter 824 through the transmit antenna 808. According to another illustration, base station 802 can receive signal(s) from (e.g., with receiver 810, ... ) and/or transmit signal(s) to (e.g., with transmitter 824, ... ) one or more disparate base stations via a backhaul. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores data to be transmitted to or received from mobile device(s) 804 and/or disparate base station(s) and/or any other suitable information related to performing the various actions and functions set forth herein. Processor 814 is further coupled to a coordinated scheduling component 818 and/or an ACK transmission component 820. Coordinated scheduling component 818 can be substantially similar to coordinated scheduling component 210 of FIG. 2 and/or coordinated scheduling component 216 of FIG. 2. Moreover, ACK transmission component 820 can be substantially similar to ACK transmission component 406 of FIG. 4 and/or ACK transmission component 408 of FIG. 4. Coordinated scheduling component 818 can enable cooperating with disparate base station(s) to assign uplink resources to one or more mobile devices 804 for utilization in connection with sending uplink signal(s) (e.g., SRS(s), ... ). Moreover, ACK transmission component 820 can identify downlink resources to employ for sending acknowledgments to the one or more mobile devices 804 in response to receipt of the uplink signal(s). Further, ACK transmission component 820 can transmit such acknowledgments. Moreover, although not shown, it is to be appreciated that base station 802 can further include a channel estimation component (e.g., substantially similar to channel estimation component 214 of FIG. 2 and/or channel estimation component 220 of FIG. 2, ... ) and/or a cooperation component (e.g., substantially similar to cooperation component 402 of FIG. 4 and/or cooperation component 404 of FIG. 4, ... ). Base station 802 can further include a modulator 822. Modulator 822 can multiplex a frame for transmission by a transmitter 824 through antennas 808 to mobile device(s) 804 in accordance with the aforementioned description. Although depicted as being separate from the processor 814, it is to be appreciated that coordinated scheduling component 818, ACK transmission component 820, and/or modulator 822 can be part of processor 814 or a number of processors (not shown).

Figure 9:
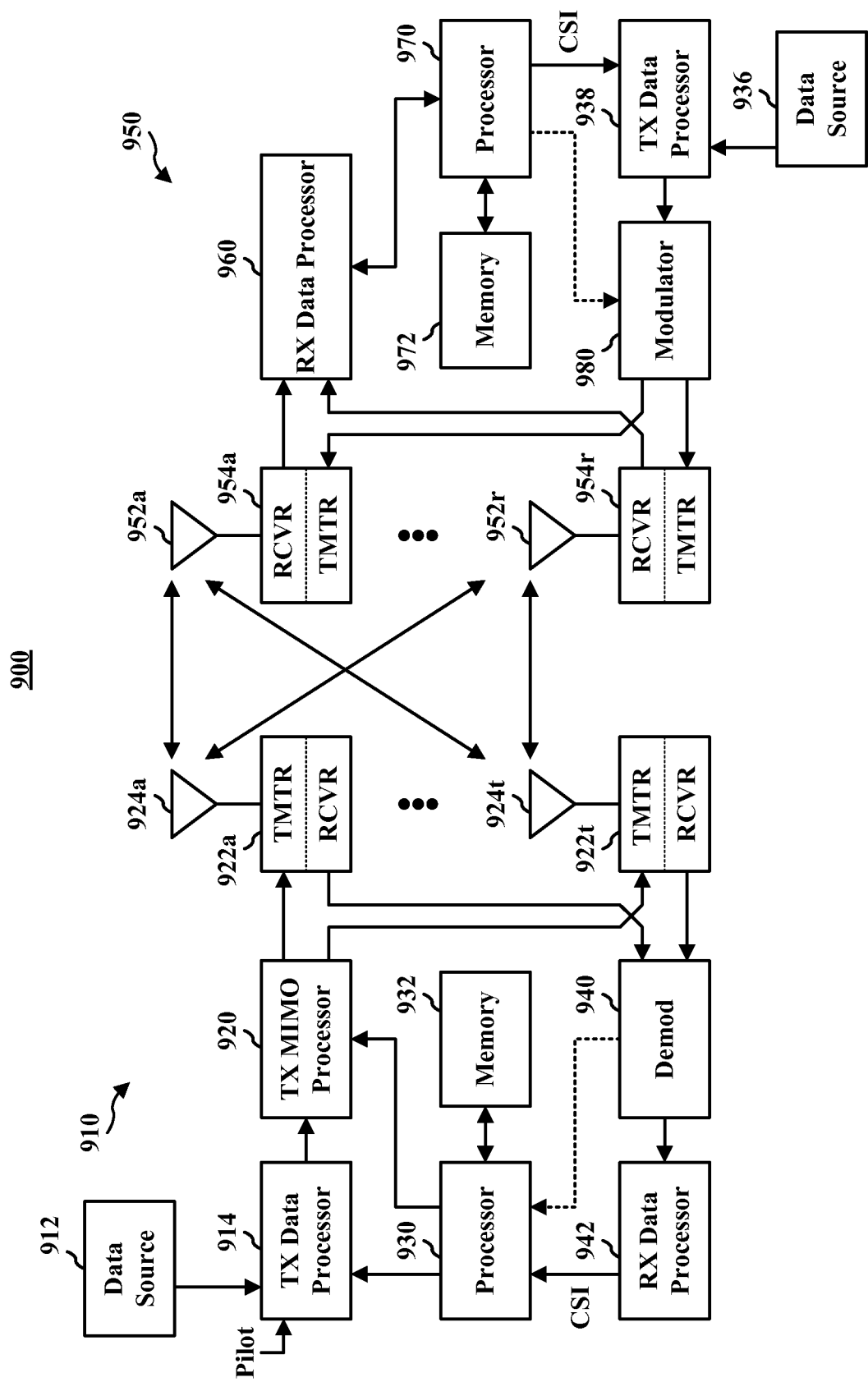
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-2, 4, 7-8 and 10) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930. Memory 932 can store program code, data, and other information used by processor 930 or other components of base station 910.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
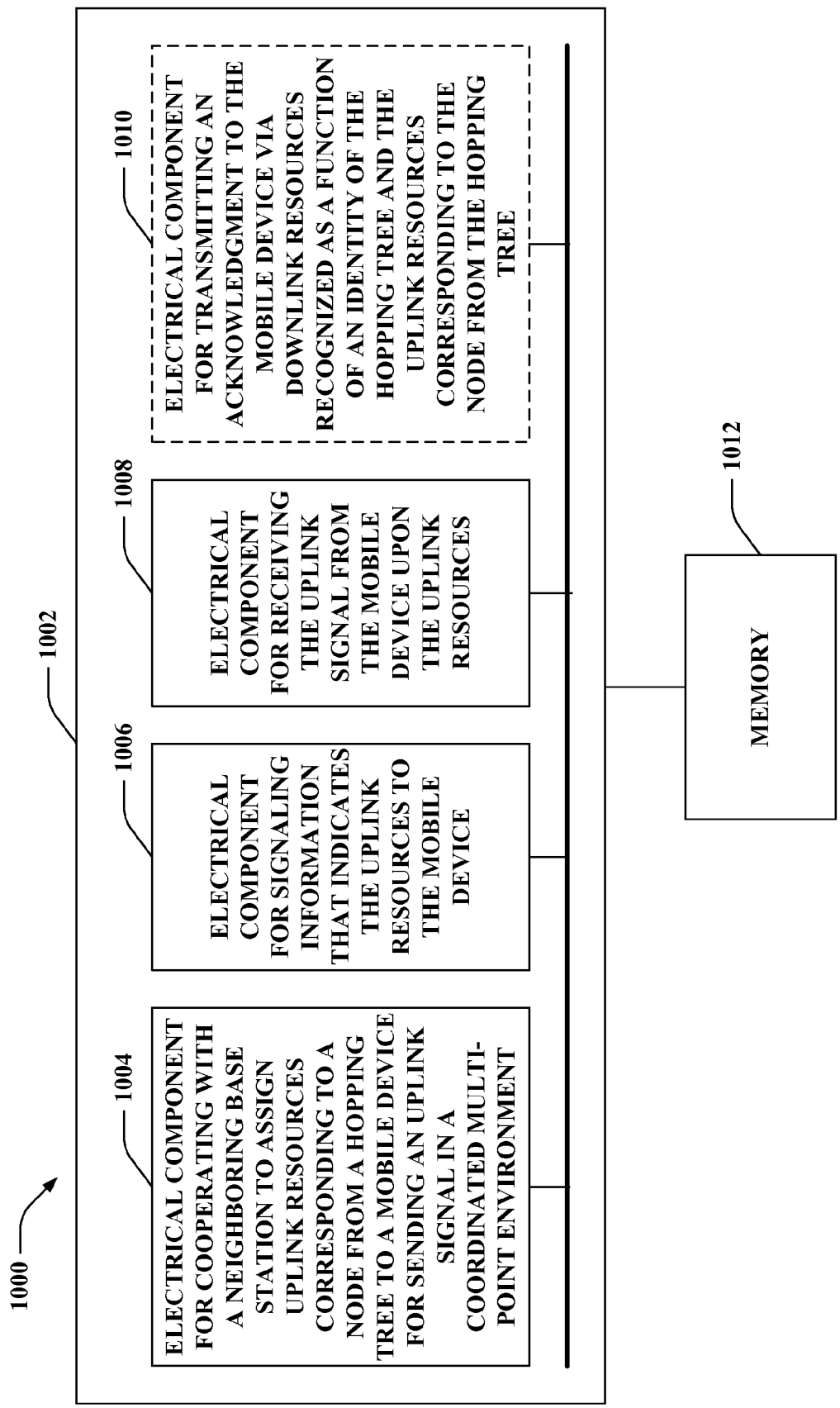
FIG. 10 is an illustration of an example system that enables employing a plurality of hopping trees across base stations in a wireless communication environment.

With reference to FIG. 10, illustrated is a system 1000 that enables employing a plurality of hopping trees across base stations in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for cooperating with a neighboring base station to assign uplink resources corresponding to a node from a hopping tree to a mobile device for sending an uplink signal in a coordinated multi-point environment 1004. Further, logical grouping 1002 can include an electrical component for signaling information that indicates the uplink resources to the mobile device 1006. Moreover, logical grouping 1002 can include an electrical component for receiving the uplink signal from the mobile device upon the uplink resources 1008. Logical grouping 1002 can also optionally include an electrical component for transmitting an acknowledgment to the mobile device via downlink resources recognized as a function of an identity of the hopping tree and the uplink resources corresponding to the node from the hopping tree 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
coordinating, by a first base station, with a second neighboring base station to assign first uplink resources for a first uplink signal from a first mobile device in an uplink coordinated multi-point environment, the assignment based at least in part on a cooperative scheduling communication received from the second neighboring base station, the cooperative scheduling communication enabling the first base station to control interference between the first mobile device and a second mobile device according to channel estimations performed at the first base station and the second neighboring base station;
coordinating, by the first base station, with the second neighboring base station to schedule the first uplink signal from the first mobile device on a first subframe or a first subband;
coordinating, by the first base station, with the second neighboring base station to schedule a second uplink signal from the second mobile device on a second subframe or a second subband that is different from the first subframe or the first subband scheduled for the first uplink signal from the first mobile device;
signaling information that identifies the first uplink resources assigned to the first mobile device; and
receiving the first uplink signal from the first mobile device upon the first uplink resources.

2. The method of claim 1, wherein the first uplink signal is a sounding reference signal (SRS).

3. The method of claim 2, wherein the SRS is an uplink pilot evaluated for channel estimation.

4. The method of claim 1, further comprising transmitting an acknowledgment to the first mobile device via downlink resources identified as a function of the first uplink resources, the downlink resources being distinct from disparate downlink resources utilized for transmitting an acknowledgment to the second mobile device from the second neighboring base station.

5. The method of claim 4, wherein the downlink resources used for the acknowledgment for the first mobile device differ from the disparate downlink resources used for the acknowledgment for the second mobile device when the first uplink resources employed by the first mobile device are substantially similar to second uplink resources assigned to the second mobile device for the second uplink signal.

6. The method of claim 1, wherein a hopping tree is defined across the first base station and the second neighbor base station in the uplink coordinated multi-point environment.

7. The method of claim 6, further comprising:
coordinating with the second neighboring base station to assign the first mobile device to a first node of the hopping tree and the second mobile device to a second node of the hopping tree, wherein the first node maps to the first uplink resources and the second node maps to disparate, non-overlapping uplink resources.

8. The method of claim 1, wherein the first uplink signal is a pilot.

9. The method of claim 8, further comprising assigning a Zadoff-Chu sequence corresponding to the second neighboring base station to the first mobile device to orthogonalize the pilot.

10. The method of claim 1, further comprising:
transmitting an acknowledgment to the first mobile device via downlink resources recognized as a function of an identity of a hopping tree and the first uplink resources, wherein the first uplink resources correspond to a node from the hopping tree.

11. The method of claim 10, wherein a plurality of hopping trees is employed across the first base station and the second neighbor base station in the uplink coordinated multi-point environment.

12. The method of claim 10, wherein the second uplink resources correspond to a node from a disparate hopping tree, wherein second uplink resources are assigned to the second mobile device for sending the second uplink signal.

13. The method of claim 12, wherein the node from the hopping tree and the node from the disparate hopping tree map to substantially similar uplink resources over time.

14. The method of claim 12, wherein the node from the hopping tree and the node from the disparate hopping tree map to different uplink resources over time.

15. The method of claim 14, wherein the hopping tree and the disparate hopping tree utilize different hopping sequences.

16. The method of claim 15, wherein the different hopping sequences are at least one of cell-specific hopping sequences or cluster-based hopping sequences.

17. The method of claim 15, wherein the different hopping sequences are each defined as a series of a cell-specific permutation and a cluster-specific permutation.

18. A wireless communications base station apparatus, comprising:
at least one processor configured to:
assign uplink resources for a first uplink signal from a first mobile device by coordinating with a neighboring base station over a backhaul in an uplink coordinated multi-point environment, the assignment based at least in part on a cooperative scheduling communication received from the neighboring base station, the cooperative scheduling communication enabling the base station apparatus to control interference between the first mobile device and a second mobile device according to channel estimations performed with the neighboring base station;
coordinate with the neighboring base station to schedule the first uplink signal from the first mobile device on a first subframe or a first subband;
coordinating with the neighboring base station to schedule a second uplink signal from the second mobile device on a second subframe or a second subband that is different from the first subframe or the first subband scheduled for the first uplink signal from the first mobile device;
transmit information that indicates the uplink resources assigned to the first mobile device; and
obtain the first uplink signal from the first mobile device upon the uplink resources.

19. The wireless communications apparatus of claim 18, wherein the first uplink signal is a sounding reference signal.

20. The wireless communications apparatus of claim 18, wherein the at least one processor is further configured to:
send an acknowledgment to the first mobile device via downlink resources identified as a function of the uplink resources, the downlink resources being distinct from disparate downlink resources utilized for transmitting an acknowledgment to the second mobile device from the neighboring base station.

21. The wireless communications apparatus of claim 18, wherein a hopping tree is defined across the base station apparatus and the neighboring base station in the uplink coordinated multi-point environment.

22. The wireless communications apparatus of claim 21, wherein the at least one processor is further configured to:
coordinate with the neighboring base station over the backhaul to assign the first mobile device to a first node of the hopping tree and the second mobile device to a second node of the hopping tree, wherein the first node maps to the uplink resources and the second node maps to disparate, non-overlapping uplink resources.

23. The wireless communications apparatus of claim 18, wherein:
the uplink resources correspond to a node from a hopping tree; and
the at least one processor is further configured to transmit an acknowledgment to the first mobile device via downlink resources recognized as a function of an identity of the hopping tree and the uplink resources corresponding to the node from the hopping tree.

24. The wireless communications apparatus of claim 23, wherein a plurality of hopping trees is employed across the base station apparatus and the neighboring base station in the uplink coordinated multi-point environment.

25. The wireless communications apparatus of claim 23, wherein second uplink resources corresponding to a node from a disparate hopping tree are assigned to the second mobile device for sending the second uplink signal.

26. The wireless communications apparatus of claim 25, wherein the node from the hopping tree and the node from the disparate hopping tree map to substantially similar uplink resources over time.

27. The wireless communications apparatus of claim 25, wherein the node from the hopping tree and the node from the disparate hopping tree map to different uplink resources over time.

28. A base station apparatus, comprising:
means for cooperating with a neighboring base station to assign uplink resources corresponding to a node from a hopping tree to a first mobile device for sending a first uplink signal in a coordinated multi-point environment, the assignment based at least in part on a cooperative scheduling communication received from the neighboring base station, the cooperative scheduling communication enabling the base station apparatus to control interference between the first mobile device and a second mobile device according to channel estimations performed with the neighboring base station;
means for coordinating with the neighboring base station to schedule the first uplink signal from the first mobile device on a first subframe or a first subband;
means for coordinating with the neighboring base station to schedule a second uplink signal from the second mobile device on a second subframe or a second subband that is different from the first subframe or the first subband scheduled for the first uplink signal from the first mobile device;
means for signaling information that indicates the uplink resources assigned to the first mobile device; and
means for receiving the first uplink signal from the first mobile device upon the uplink resources.

29. The apparatus of claim 28, further comprising means for transmitting an acknowledgment to the first mobile device via downlink resources recognized as a function of an identity of the hopping tree and the uplink resources corresponding to a node from the hopping tree.

30. The apparatus of claim 28, wherein a plurality of hopping trees is employed across the base station apparatus and the neighboring base station in the coordinated multi-point environment.

31. The apparatus of claim 28, wherein second uplink resources corresponding to a node from a disparate hopping tree are assigned to the second mobile device for sending the second uplink signal.

32. The apparatus of claim 31, wherein the node from the hopping tree and the node from the disparate hopping tree map to substantially similar uplink resources over time.

33. The apparatus of claim 31, wherein the node from the hopping tree and the node from the disparate hopping tree map to different uplink resources over time.

34. The apparatus of claim 28, wherein the first uplink signal is a sounding reference signal.

35. A computer program product, comprising:
a non-transitory computer-readable medium comprising:
code for causing at least one computer at a first base station to cooperate with a second neighboring base station to assign uplink resources corresponding to a first node from a hopping tree to a first mobile device for sending a first uplink signal in a coordinated multi-point environment, the assignment based at least in part on a cooperative scheduling communication received from the second neighboring base station, the cooperative scheduling communication enabling the first base station to control interference between the first mobile device and a second mobile device according to channel estimations performed with the second neighboring base station;
code for causing at least one computer at the first base station to coordinate with the second neighboring base station to schedule the first uplink signal from the first mobile device on a first subframe or a first subband;
code for causing at least one computer at the first base station to coordinate with the second neighboring base station to schedule a second uplink signal from the second mobile device on a second subframe or a second subband that is different from the first subframe or the first subband scheduled for the first uplink signal from the first mobile device;
code for causing at least one computer to signal information that identifies the uplink resources assigned to the first mobile device; and
code for causing at least one computer to receive the first uplink signal from the first mobile device upon the uplink resources.

36. The computer program product of claim 35, wherein the computer-readable medium further comprises code for causing at least one computer to transmit an acknowledgment to the first mobile device via downlink resources recognized as a function of an identity of the hopping tree and the uplink resources corresponding to a node from the hopping tree.

37. The computer program product of claim 35, wherein a plurality of hopping trees is employed across the first base station and the neighboring base station in the coordinated multi-point environment.

38. The computer program product of claim 35, wherein second uplink resources corresponding to a node from a disparate hopping tree are assigned to the second mobile device for sending the second uplink signal.

39. The computer program product of claim 38, wherein the node from the hopping tree and the node from the disparate hopping tree map to substantially similar uplink resources over time.

40. The computer program product of claim 38, wherein the node from the hopping tree and the node from the disparate hopping tree map to different uplink resources over time.

41. The computer program product of claim 35, wherein the first uplink signal is a sounding reference signal.

42. A base station apparatus, comprising:
a coordinated scheduling component that cooperates with a neighboring base station to assign uplink resources to a first mobile device for sending a first uplink signal in an uplink coordinated multi-point environment, the assignment based at least in part on a cooperative scheduling communication received from the neighboring base station, the cooperative scheduling communication enabling the base station apparatus to control interference between the first mobile device and a second mobile device according to channel estimations performed with the neighboring base station, and wherein the coordinated scheduling component coordinates with the neighboring base station over a backhaul to schedule the first uplink signal from the first mobile device on a first subframe or a first subband, and coordinates with the neighboring base station over the backhaul to schedule a second uplink signal from the second mobile device on a second subframe or a second subband that is different from the first subframe or the first subband scheduled for the first uplink signal from the first mobile device;
a reception component that receives the first uplink signal sent by the first mobile device; and a channel estimation component that performs channel estimation based upon the first uplink signal.

43. The apparatus of claim 42, further comprising an acknowledgment (ACK) transmission component that transmits an acknowledgment to the first mobile device via downlink resources recognized as a function of the uplink resources, the downlink resources being distinct from disparate downlink resources utilized for transmitting an acknowledgment to the second mobile device from the neighboring base station.

* * * * *